United States Patent [19]

Kodama et al.

[11] Patent Number: 4,705,827

[45] Date of Patent: Nov. 10, 1987

[54] RESIN COMPOSITION COMPRISING UNSATURATED DICARBOXYLIC ACID ANHYDRIDE POLYMER, POLYCARBONATE RESIN AND MODIFIED OLEFIN POLYMER

[75] Inventors: Mikio Kodama, Hirakata; Akitoshi Ito, Nabari; Motoichi Yano, Settsu; Takayoshi Fujiwara, Osaka; Satoshi Umeyama, Amagasaki, all of Japan

[73] Assignee: Sumitomo Naugatuck Co., Ltd., Osaka, Japan

[21] Appl. No.: 845,722

[22] Filed: Mar. 28, 1986

[30] Foreign Application Priority Data

| Mar. 29, 1985 | [JP] | Japan | 60-68138 |
| May 16, 1985 | [JP] | Japan | 60-104557 |
| May 17, 1985 | [JP] | Japan | 60-106572 |
| May 22, 1985 | [JP] | Japan | 60-110990 |

[51] Int. Cl.$^4$ ............................................. C08L 69/00
[52] U.S. Cl. ........................................ 525/67; 525/69; 525/146; 525/148; 525/468
[58] Field of Search .................. 525/67, 148, 69, 146, 525/468

[56] References Cited

U.S. PATENT DOCUMENTS

| 3,966,842 | 6/1976 | Ludwig et al. | 525/148 X |
| 4,496,693 | 1/1985 | Rosenquist et al. | 525/146 |
| 4,569,969 | 2/1986 | Jones et al. | 525/67 |

*Primary Examiner*—Theodore E. Pertilla

[57] ABSTRACT

A thermoplastic resin composition having excellent physical properties such as heat resistance and impact resistance and being improved in resistance to heat decomposition which comprises:

(A) an unsaturated dicarboxylic acid anhydride polymer produced by polymerization of (a-1) at least one unsaturated dicarboxylic acid anhydride and (a-2) at least one of aromatic vinyl compounds, unsaturated nitrile compounds and unsaturated carboxylic acid esters in the presence or absence of (a-3) at least one rubbery material, (B) a polycarbonate resin, (C) a modified olefin polymer, and optionally (D) a rubber-reinforced resin produced by polymerizing (d-1) at least one of aromatic vinyl compounds, unsaturated nitrile compounds and unsaturated carboxylic acid esters in the presence of (d-2) a rubber polymer.

14 Claims, No Drawings

RESIN COMPOSITION COMPRISING UNSATURATED DICARBOXYLIC ACID ANHYDRIDE POLYMER, POLYCARBONATE RESIN AND MODIFIED OLEFIN POLYMER

The present invention relates to a thermoplastic resin composition. More particularly, it relates to a thermoplastic resin composition comprising an unsaturated dicarboxylic acid anhydride polymer, a polycarbonate resin and a modified polyolefin and being excellent in physical properties such as resistance to heat decomposition, heat resistance, impact resistance and weld strength.

As well known, copolymers of unsaturated dicarboxylic acid anhydrides such as maleic anhydride with aromatic vinyl compounds such as styrene are excellent in heat resistance but inferior in impact resistance. In order to overcome this defect, there have been made various proposals, which include, for instance, polymerization of maleic anhydride and styrene in the presence of a rubbery material (Japanese Patent Publication (unexamined) No. 42091/73), incorporation of a polycarbonate resin into a maleic anhydride/styrene copolymer (Japanese Patent Publication (examined) No. 27133/82), incorporation of a polycarbonate resin into a rubber modified maleic anhydride/styrene copolymer (Japanese Patent Publication (examined) Nos. 28339/78 and 27134/82 and U.S. Pat. No. 3,966,842), etc.

However, polymers comprising units of maleic anhydride are apt to be decomposed due to heat during granulating or molding so that their impact resistance is deteriorated and also the impact resistsance improving effect by polycarbonate resins or rubbers introduced therein is lowered. Since the melt viscosity of polycarbonate resins is high, the compositions incorporated therewith require a high temperature, for their processing. Further, the allowable temperature range is small, and therefore the processing conditions for manufacture of high quality products are quite restricted.

For suppression of the heat decomposition, the content of maleic anhydride may be decreased, but in such case, the heat resistance is lowered. In addition, the compatibility with polycarbonate resins is deteriorated, and even the impact resistance is reduced. When the rubber content is increased, the balance between heat resistance and processability becomes inferior.

As a reult of the extensive study, it has now been found that a thermoplastic resin composition comprising an unsaturated dicarboxylic acid anhydride polymer, a polycarbonate resin and a modified olefin polymer as the essential components show excellent physical properties. It is particularly notable that such thermoplastic resin composition is highly resistant to heat decomposition while maintaining good heat resistance, high impact strength and excellent weld strength.

The thermoplastic resin composition of the invention comprises:

(A) an unsaturated dicarboxylic acid anhydride polymer produced by polymerization of (a-1) at least one unsaturated dicarboxylic acid anhydride and (a-2) at least one of aromatic vinyl compounds, unsaturated nitrile compounds and unsaturated carboxylic acid esters in the presence or absence of (a-3) at least one rubbery material,
(B) a polycarbonate resin,
(C) a modified olefin polymer, and optionally
(D) a rubber-reinforced resin produced by polymerizing (d-1) at least one of aromatic vinyl compounds, unsaturated nitrile compounds and unsaturated carboxylic acid esters in the presence of (d-2) a rubbery polymer.

The unsaturated dicarboxylic acid anhydride polymer (A) is a polymer obtainable by polymerization of (a-1) at least one unsaturated dicarboxylic acid anhydride and (a-2) at least one of aromaic vinyl compounds, unsaturated nitrile compounds and unsaturated carboxylic acid esters in the presence or absence of (a-3) a rubbery material.

With respect to the weight proportion of the components (a-1), (a-2) and (a-3), any particular limitation is not present. For realization of high heat resistance and good processability, however, the content of the component (a-1) in the unsaturated dicarboxylic acid anhydride polymer (A) is preferred to be from 5 to 30% by weight. In case of the rubbery material as the component (a-3) being not used, the remainder is the component (a-2). In case of the rubbery material being used, the contents of the components (a-2) and (a-3) are preferred to be form 50 to 90% by weight and from 5 to 25% by weight, respectively. In usual, the unsaturated dicarboxylic dicarboxylic acid anhydride polymer (A) is preferred to have an intrinsic viscosity of about 0.3 to 1.5 (when determined on dimethylformamide solution at 30° C.) in order to achieve high mechanical strength and good processability.

Examples of the unsaturated dicarboxylic acid anhydride as the component (a-1) are maleic anhydride, itaconic anhydride, citraconic anhydride, aconitic anhydride, etc. These may be used solely or in combination. Among them, the use of maleic anhydride is favorable.

As the aromatic vinyl compound which may be one of the component (a-2), there may be exemplified styrene, alpha-methylstyrene, p-methylstyrene, p-t-butylstyrene, dimethylstyrene, etc. Among them, the use of styrene and/or alpha-methylstyrene is preferred. Examples of the unsaturated nitrile compound are acrylonitrile, methacrylonitrile, maleonitrile, etc. Among them, the use of acrylonitrile is favored. Examples of the unsaturated carboxylic acid ester are alkyl acrylates (e.g. methyl acrylate, ethyl acrylate, butyl acrylate), alkyl methacrylates (e.g. methyl methacrylate, ethyl methacrylate, butyl methacrylate), hydroxyalkyl acrylates (e.g. hydroxethyl acrylate, hydroxypropyl acrylate), hydroxyalkyl methacrlates (e.g. hydroxyethyl methacrylate, hydroxypropyl methacrylate), etc. Preferred are methyl methacrylate, ethyl methacrylate, etc. From these monomers, one or more may be chosen as the component (a-2), and the use of the aromatic vinyl compound alone or in combination with the other monomer(s), particularly the saturated nitrile compound, is favorable.

As the rubbery material which is the component (a-3), there are exemplified polybutadiene, styrene/butadiene copolymer, acrylonitrile/butadiene copolymer, ethylene/propylene copoymer, ethylene/propylene/non-conjugated diene (e.g. dicyclopentadiene, ethylidenenorbornene, 1,4-cyclohexadiene, 1,4-cycloheptadiene, 1,5-cyclooctadiene) copolymer, butyl methacrylate polymer, ethylene/vinyl acetate copolymer, chlorinated polyethylene, etc. These may be used solely or in combination.

For preparation of the unsaturated dicarboxylic acid anhydride polymer (A), there may be adopted any conventional polymerization procedure such as emulsion polymerization, suspension polymerization, bulk polymerization, solution polymerization, emulsion-suspension polymerization and bulk-suspension polymerization, among which bulk polymerization, solution polymerization and bulk-suspension polymerization are preferred.

One of the typical procedures for preparation of the unsaturated dicarboxylic acid anhydride polymer (A) comprises introducing, for instance, sytrene and maleic anhydride in the presence or absence of finely cut polybutadiene rubber into a reactor, adding a polymerization initiator and a chain transfer agent thereto respectively in amounts of 0.001 to 5 parts by weight and of 0.01 to 1.0 part by weight to 100 parts of the monomers and subjecting the resultant mixture to bulk polymerization at a temperature of 50° to 250° C. The reaction mixture is poured in a great amount of methanol to deposit the produced polymer, which is then collected.

Another typical procedure comprises introducing, for instance, styrene and maleic anhydride in the presence or absence of finely cut polybutadiene rubber into a reactor, adding a polymerization initiator and a chain transfer agent thereto respectively in amounts of 0.001 to 5 parts by weight and of 0.01 to 1.0 part by weight to 100 parts of the monomers and subjecting the resultant mixture to bulk polymerization at a temperature of 50° to 250° C. until the coversion reaches to 5–60%. To the reaction mixture, a suspending agent is added, and a polymerization initiator is added thereto in an amount of 0.01 to 1 part by weight to 100 parts by weight of the monomers. The resulting mixture is subjected to suspension polymerization at a temperature of 50° to 150° C. From the reacton mixture, the produced polymer is recovered by dehydration.

As the polymerization initiator, there may be used any one chosen from azo compounds (e.g. 2,2'-azobisisobutyronitrile), organic peroxides (e.g. t-butyl peroxypivalate lauroyl peroxide, 3,5,5-trimethylhexanoyl peroxide, benzoyl peroxide, t-butyl peroxy-2-ethylhexanoate, t-butyl peroxylaurate, t-butyl peroxybenzoate, dicumyl peroxide, di-t-butyl peroxide), etc. Examples of the chain transfer agent are alkylmercaptan, thioglycolic esters, terpinolene, isotetralin, etc. As the suspending agent, there may be exemplified inorganic compounds hardly soluble in water (e.g. magnesium hydroxide, calcium phosphate, hydroxy apatite), water-soluble high molecular compounds (e.g. partially saponified polyvinyl alcohol, sodium polyacrylate, polyalkylene oxide, methyl cellulose, ethyl cellulose, hydroxypropyl methyl cellulose), etc.

As the polycarbonate resin (B), there are exemplified aromatic polycarbonates, aliphatic polycarbonates, aliphatic-aromatic polycarbonates, etc., among which aromatic polycarbonates are particularly favorable. In usual, polymers and copolymers of bisphenols such as 2,2-bis(4-hydroxphenyl)alkanes, bis(4-hydroxyphenyl)ethers, bis(4-hydroxyphenyl)sulfones, bis(4-hydroxyphenyl)sulfides and bis(4-hydroxyphenyl)sulfoxides, etc. and/or halogenated bisphenols may be employed. Typical examples of the polycarbonate resin and their production are described in various textbooks and literatures including Encyclopedia of Polymer Science and Technology, Vol. 10, pages 710 to 764 (1969). While any particular limitation is present on the molecular weight of the polycarbonate resin (B), it is usually of not less than about 10,000, preferably from about 20,000 to 40,000.

The modified olefin polymer (C) may be the one chosen from (C-I) an olefin/alkyl unsaturated carboxylate copolymer, (C-II) an unsaturated carboxylic acid-modified olefin polymer and (C-III) an epoxy group-containing olefin polymer.

The olefin/alkyl unsaturated carboxylate copolymer (C-I) may be the one obtainable by polymerization of at least one olefin and at least one alkyl unsaturated carboxylate with or without at least one other polymerizable monomer. The weight percentages of the olefin units, the alkyl unsaturated carboxylate units and the other polymerizable monomer units are preferred respectively to be from about 30 to 95%, from about 5 to 70% and from about 0 to 20%.

Examples of the olefin are ethylene, propylene, butene-1, 4-methylpentene-1, etc. Among them, ethylene and propylene are preferred. Examples of the alkyl unsaturated carboxylate are alkyl acrylates (e.g. methyl acrylate, ethyl acrylate, butyl acrylate), alkyl methacrylates (e.g. methyl methacrylate, elthyl methacrylate, butyl methacrylate), hydroxyalkyl acrylates (e.g. hydroxyethyl acrylate, hydroxypropyl acrylate), hydroxyalkyl methacrylates (e.g. hydroxyethyl methacrylate, hydroxypropyl methacrylate), etc. As the other polymerizable monomer, there are exemplified ethylenically unsaturated monomers such as vinyl saturated carboxylates wherein the saturated carboxylate moiety has 2 to 6 carbon atoms, vinyl halides, vinyl ethers, N-vinyl-lactams and carbonamides.

Preparation of the olefin-alkyl unsaturated carboxylate polymer (C-I) may be accomplished by a per se conventional polymerization procedure.

For instance, an olefin and an alkyl unsaturated carboxylate with or without any other polymerizable monomer are charged into a reactor, an organic peroxide is added thereto, and polymerization is effected at a temperature of 40° to 300° C. under a pressure of 50 to 4,000 atm.

The unsaturated carboxylic acid-modified olefin polymer (C-II) is a polymer comprising units of at least one of unsaturated carboxylic acids and their anhydrides and units of at least one of olefins with or without units of at least one of other polymerizable monomers. The weight percentages of the units of unsaturated carboxylic acids and/or their anhydrides, the units of olefins and and the units of other polymerizable monoers are respectively preferred to be from about 0.01 to 40%, from about 10 to 99.99% and from about 0 to 50%.

Examples of the unsaturated carboxylic acids and their anhydrides are monocarboxylic acids (e.g. acrylic acid, methacrylic acid), dicarboxylic acids (e.g. maleic acid, fumaric acid, itaconic acid), dicarboxylic acid anhydrides (e.g. maleic anhydride, itaconic anhydride), etc. Among them, the use of dicarboxylic acid anhydrides is favorable. Examples of the olefins are ethylene, propylene, butene-1, 4-methylpentene-1-etc., among which ethylene and propylene are preferred. As the other polymerizable monomer, there are exemplified ethylenically unsaturated monomers such as vinyl saturated carboxylates wherein the saturated carboxylate moiety has 2 to 6 carbon atoms, alkyl acrylates or methacrylates wherein the alkyl moiety has 1 to 8 carbon atoms, alkyl maleates wherein the alkyl moiety has 1 to 8 carbon atoms, vinyl halides, vinyl ethers, N-vinyl-lactams and carbonamides.

Preparation of the unsaturated carboxylic acid-modified olefin polymer (C-II) may be accomplished, for instance, by reacting a polymer comprising units of at least one olefin and optionally units of at least one other polymerizable monomer with an unsaturated carboxylic acid or its anhydride while heating.

Like the olefin-alkyl unsaturated carboxylate polymer (C-I), the unsaturated carboxylic acid-modified olefin polymer (C-II) can be efficiently produced by polymerization under elevated pressure. Alternatively, it may be produced by melt-kneading polyolefin with an unsaturated carboxylic acid anhydride in the presence of a polymerization initiator.

The epoxy group-containing olefin polymer (C-III) is a copolymer of at least one of unsaturated epoxy compounds and at least one of olefins with or without at least one of other polymerizable monomers. While no special limitation is present on the composition of these monomers, the content of the unsaturated epoxy compound units is preferred to be from about 0.05 to 95% by weight, particularly from about 0.1 to 50% by weight.

As the unsaturated epoxy compound, there may be used the one having an unsaturated group, copolymerizable with an olefin and any other polymerizable monomer, and an epoxy group in the molecule. For instance, unsaturated glycidyl esters, unsaturated glycidyl ethers, epoxyalkenes, p-glycidylstyrenes, etc. are usable. Those of the following formulas are also usable:

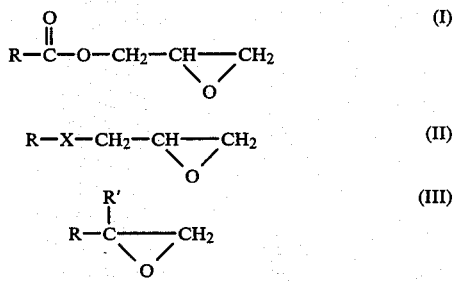

wherein R is a $C_2$–$C_{18}$ hydrocarbon group having an ethylenic unsaturation, R' is a hydrogen atom or a methyl group and X is

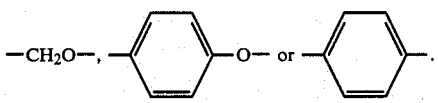

More specifically, the following compounds are exemplified: glycidyl acrylate, glycidyl methacrylate, glycidyl itaconate, butenecarboxylates, allyl glycidyl ether, 2-methylallyl glycidyl ether, styrene-p-glycidyl ether, 3,4-epoxybutene, 3,4-epoxy-3-methyl-1-butene, 3,4-epoxy-1-pentane, 3,4-epoxy-3-methylpentene, 5,6-epoxy-1-hexene, vinylcyclohexene monoxide, p-glycidylstyrene, etc. Among them, preferred are glycidyl acrylate and glycidyl methacrylate. Examples of the olefin are ethylene, propylene, butene-1, 4-methylpentene-1, etc. As the other polymerizable monomer, there are exemplified ethylenically unsaturated compounds such as vinyl esters having a $C_2$–$C_6$ saturated carboxylic acid moiety, acrylic and methacrylic esters having a $C_1$–$C_8$ saturated alcohol moiety, maleic esters having a $C_1$–$C_8$ saturated alcohol moiety, vinyl halides, vinyl ethers, N-vinyllactams, carbonamides, etc. These ethylenically unsaturated compounds may be copolymerized with the unsaturated epoxy compound and the olefin in an amount of not more than about 50% by weight, especially from about 0.1 to 45% by weight based on the total weight of the monomers to be copolymerized.

The epoxy group-containing olefin polymer (c-3) may be prepared by various procedures, of which one typical example comprises contacting the unsaturated epoxy compound(s) and the olefin(s) with or without the other polymerizable monomer(s) onto a radical generating agent (e.g. benzoyl peroxide) at a temperature of about 40° to 300° C. under a pressure of about 50 to 4000 atm. Another typical example comprises irradiating gamma-rays to a mixture of polyolefin with the unsaturated epoxy compound(s), for instance, at a critical temperature of 9.9° C. under a critical pressure of 50.7 atm.

Among the components (c-1), (c-2) and (c-3), one or more may be chosen and used. Preferred is the use of the component (c-3), i.e. the epoxy group-containing olefin polymer, or its combination with the components (c-1) and/or (c-2).

The rubber-reinforced resin (D) is a resin obtained by polymerization of (d-1) at least one of aromatic vinyl compounds, unsaturated nitrile compounds and unsaturated carboxylic acid esters in the presence of (d-2) a rubbery polymer.

Examples of the aromatic vinyl compounds, the unsaturated nitrile compounds and the unsaturated carboxylic acid esters may be those as explained on the component (a-1). Also, examples of the rubbery polymer may be those as exemplified on the component (a-3). One or more chosen from the materials under the category of the component (d-1) may be polymerized in the presence of one or more chosen from the materials under the categroy of the component (d-2). Taking enhancement of the impact strength and the processability into consideration, the use of aromatic vinyl compounds with unsaturated nitrile compounds and/or unsaturated carboxylic acid esters as the component (d-1) is favorable. In this case, the other monomer may be used additionally.

No particular limitation is present on the proportion of the components (d-1) and (d-2). In general, the weight proportion of the components (d-1) and (d-2) is preferred to be from about 95:5 to 20:80 for higher impact resistance and better processability.

Production of the rubber-reinforced resin (D) may be accomplished by any conventional polymerization procedure such as emulsion polymerization, suspension polymerization, bulk polymerization, solution polymerization, emulsion-suspension polymerization or bulk-suspension polymerization.

In the thermoplastic resin composition of the invention, the weight proportion of the unsaturated dicarboxylic acid anhydride polymer (A), the polycarbonate resin (B), the modified olefin polymer (C) and optionally the rubber-reinforced resin (D) may be appropriately decided depending upon the desired physical characteristics. In general, the weight proportion of the unsaturated dicarboxylic acid anhydride polymer (A) and the polycarbonate resin (B) may be usually from about 10:90 to 90:10. When the rubber-reinforced resin (D) is employed, the weight proportion of the unsaturated dicarboxylic acid anhydride polymer (A), the polycarbonate resin (B) and the rubber-reinforced resin (D) may be about 5–60:30–90:5–50. In the case wherein the unsaturated dicarboxylic acid anhydride polymer (A) comprises the rubbery material, the weight proportion of (A), (B) and (D) is preferred to be 5–50:30–90–

:5–50. In the case wherein the unsaturated dicarboxylic acid anhydride polymer (A) does not comprise the rubbery material, the weight proportion of (A), (B) and (D) is favorable to be about 10–60:30:–80:10–50. The modified olefin polymer (C) may be used normally in an amount of about 0.1 to 100 parts by weight to 100 parts by weight of the combined amount of the unsaturated dicarboxlyic acid anhydride polymer (A), the polycarbonate resin (B) and, when used, the rubber reinforced resin (D).

For preparation of the thermoplastic resin composition of the invention, the unsaturated dicarboxylic acid anhydride polymer (A), the polycarbonate resin (B), the modified olefin polymer (C) and optionally the rubber reinforced resin (D) may be mixed together by the use of any conventional mixing apparatus such as a Banbury mixer, a single screw extruder or a twin screw extruder. If desired, any conventional additive(s) such as dyestuffs, pigments, antioxidants, plasticizers, antistatic agents, ultraviolet ray absorbers, flame retardant agents, lubricants, metallic fibers, glass fibers and inorganic fillers may be incorporated into the thermoplastic resin composition.

Practical and presently preferred embodiments of the invention are illustratively shown in the following Examples wherein % and part(s) are by weight unless otherwise indicated.

REFERENCE EXAMPLE 1

Preparation of the unsaturated dicarboxylic acid anhydride polymer (A):

According to a per se conventional bulk or bulk-suspension polymerization procedure, monomers as shown in Table 1 were polymerized to make the unsaturated dicarboxylic acid anhydride polymer (A).

TABLE 1

| Components | Unsaturated dicarboxylic acid anhydride polymer (A) (Parts(s)) | |
|---|---|---|
| | A-1 | A-2 |
| Maleic anhydride | 13 | 13 |
| Styrene | 87 | 62 |
| Acrylonitrile | — | 25 |
| Product (Intrinsic viscosity) | 0.58 | 0.63 |
| Polymerization procedure* | B | B-S |

Note: *
B The polymerization was carried out by bulk polymerization.
B-S The polymerization was carried out by bulk-suspension polymerization.

REFERENCE EXAMPLE 2

Preparation of the modified olefin polymer (C):

(C-1) Ethylene and glycidyl methacrylate as well as a catalyst were charged into an autoclave type apparatus for production of polyethylene, and bulk polymerization was carried out at a temperature of 150° to 300° C. under a pressure of 2,000 kg/cm$^2$ to make a modified olefin polymer (C-1), i.e. ethylene/glycidyl methacrylate (90:10 by weight) copolymer.

(C-2) Ethylene, glycidyl methacrylate and vinyl acetate as well as a catalyst were charged into an autoclave type apparatus for production of polyethylene, and bulk polymerization was carried out at a temperature of 150° to 300° C. under a pressure of 2,000 kg/cm$^2$ to make a modified olefin polymer (C-2), i.e., ethylene/glycidyl methacrylate/vinyl acetate (85:10:5 by weight) copolymer.

(C-3) Powdery polyethylene (100 parts) and maleic anhydride (1 part) were mixed together and melt kneaded by the aid of two rolls for about 3 minutes to make a modified olefin polymer (C-3), i.e. maleic anhydride-modified polyethylene containing maleic anhydride in an amount of 1% by weight.

(C-4) Ethylene and methyl methacrylate as well as a catalyst were charged into an autoclave type apparatus for production of polyethylene, and bulk polymerization was carried out at a temperature of 150° to 300° C. under a pressure of 2,000 kg/cm$^2$ to make a modified olefin polymer (C-4), i.e. ethylene/methyl methacrylate (90:10 by weight) copolymer.

EXAMPLES 1 TO 9 AND COMPARATIVE EXAMPLES 1 TO 4

THe unsaturated dicarboxylic acid anhydride polymer (A-1 or A-2) as obtained in Reference Example 1, the polycarbonate resin (an aromatic polycarbonate resin comprising bisphenol A; molecular weight, 25,000) and the modified olefin polymer (C-1, C-2, C-3 or C-4) as obtained in Reference Example 2 were mixed well and melt kneaded by the aid of a single screw extruder (resin temperature, 260° C.) to make a thermoplastic resin composition.

The thermoplastic resin composition thus obtained was subjected to determination of the physical characteristics by the following procedures:

Resistance to heat decomposition:

(1) Falling ball impact strength after retention

The thermoplastic resin composition was retained in the cylinder of an injection molding machine (resin temperature, 270° C.) for 15 minutes and then subjected to injection molding with a molding cycle of 10 seconds in injection time and 20 seconds in cooling time to make a plate of 60 mm long, 60 mm wide and 3 mm high. Thereafter, retention was further continued for 15 minutes, and then a plate was prepared in the same manner as above. Likewise, there were prepared 10 plates, which were subjected to test for falling ball impact strength using a steel ball of 1 kg at 23° C.

(2) Weight loss

The thermoplastic resin composition was retained at a resin temperature of 280° C. for 15 minutes, and the weight loss was measured by the use of DSC-II manufactured by Perkin-Elmer.

(3) Silver

By the use of an injection molding machine (resin temperature, 270° C.), 10 plates (each being 90 mm long, 150 mm wide and 3 mm high) were continuously manufactured with the thermoplastic resin under the molding cycle of 10 seconds in injection time and 230 seconds in cooling time. Observation was made on the presence or absence of silver streak.

Weld strength:

The thermoplastic resin composition in a melt state was injected through two gates (each being 2.5×2.0 mm) with a distance of 40 mm to make a test piece of 60 mm long, 60 mm wide and 3 mm high. The test piece was placed on cylinder of 50 mm in inner diameter, 56 mm in outer diameter and 60 mm in height. An anvil having a point of impact ($\frac{1}{4}$ inch R) was placed thereon. A steel ball was fallen down onto the anvil to measure the maximum energy value at which the test piece was not broken.

Notched Izod impact strength:

According to ASTM D-256, the strength was measured on the test piece of $\frac{1}{4}$ inch in thickness.

Heat deformation temperature:

According to ASTM D-648, the temperature was measure on the test piece of ¼ inch in thickness.

Processability:

Using a Koka flow tester (nozzle diameter, 1 mm; length, 10 mm), the flow amount was measured at a temperature of 230° C. under a pressure of 60 kg/cm².

The physical characteristics of the thermoplastic resin composition thus determined are shown in Table 2.

TABLE 2

| Composition | Example | | | | | | | | | Comparative (part(s) by weight) | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Unsaturated dicarboxylic acid anhydride polymer (A) | | | | | | | | | | | | | |
| A-1 | 80 | — | 50 | 50 | 50 | — | — | — | 30 | 80 | 80 | 50 | — |
| A-2 | — | 60 | — | — | — | 40 | 40 | 40 | — | — | — | — | 40 |
| Polycarbonate resin (B) | 20 | 40 | 50 | 50 | 50 | 60 | 60 | 60 | 70 | 20 | 20 | 50 | 60 |
| Modified olefin polymer (C) | | | | | | | | | | | | | |
| C-1 | 5 | — | 1 | — | 10 | 3 | — | 20 | — | — | — | — | — |
| C-2 | — | 0.5 | — | — | — | — | — | — | 3 | — | — | — | — |
| C-3 | — | — | — | 1 | — | — | — | — | — | — | — | — | — |
| C-4 | — | — | — | — | — | — | 3 | — | — | — | — | — | — |
| Polyethylene | — | — | — | — | — | — | — | — | — | — | 5 | — | — |
| Resistance to heat decomposition | | | | | | | | | | | | | |
| Falling ball impact strength (kg · cm) | 70 | 90 | 100 | 80 | 150 | 140 | 120 | 170 | 150 | <10 | <10 | <10 | <10 |
| Weight loss (%) | 2.9 | 2.2 | 1.6 | 1.5 | 0.8 | 0.8 | 0.7 | 0.6 | 0.8 | 10.5 | 7.7 | 8.9 | 5.7 |
| Silver | No | No | No | No | No | No | No | No | No | Yes | Yes | Yes | Yes |
| Weld strength | | | | | | | | | | | | | |
| 23° C. (kg · cm) | 40 | 45 | 70 | 50 | 100 | 100 | 85 | 150 | 130 | <10 | <10 | <10 | <10 |
| −30° C. (kg · cm) | 20 | 20 | 35 | 20 | 45 | 45 | 30 | 70 | 55 | <10 | <10 | <10 | <10 |
| Notched Izod impact strength (23° C.) (kg · cm/cm) | 3.5 | 7.5 | 11.0 | 10.5 | 15.5 | 13.3 | 12.5 | 18.9 | 25.1 | 1.0 | 1.0 | 2.4 | 7.2 |
| Heat deformation temperature (°C.) | 110 | 113 | 114 | 114 | 111 | 118 | 117 | 113 | 122 | 111 | 107 | 115 | 120 |
| Processability (230° C. 60 kg/cm²) (ml/min) | 1.1 | 0.93 | 0.88 | 0.88 | 0.55 | 0.50 | 0.51 | 0.30 | 0.25 | 1.3 | 1.5 | 0.97 | 0.78 |

When the thermoplastic composition comprises the polycarbonate resin (B) alone, the following physical characteristics were given: weld strength at 23° C. and at −30° C., more than 500 kg.cm; notched Izod impact strength at 23° C., 14.1 kg.cm/cm; heat deformation temperature, 135° C.; processability at 230° C. under 60 kg/cm², 0.01 ml/min.

From the above results, it is understood that the polycarbonate resin is excellent in heat resistance and weld strength. However, it is remarkably inferior in processability. With increase of the amount of the unsaturated dicarboxylic acid anhydride polymer incorporated into the polycarbonate resin, the processability is improved but the notched Izod impact strength and the heat deformation temperature are lowered. Particularly, the weld strength is markedly decreased with incorporation of the unsaturated dicarboxylic acid andhyride polymer irrespective of its amount.

The composition of the invention is markedly enhanced in weld strength, notched Izod impact strength and resistance to heat decomposition in comparison with the polycarbonate resin incorporated with the unsaturated dicarboxylic acid anhydride polymer. Further, the impact strength, the heat resistance and the processability are well balanced.

REFERENCE EXAMPLE 3

Preparation of the unsaturated dicarboxylic acid anhydride polymer (A):

According to a per se conventional bulk or bulk-suspension polymerization procedure, monomers as shown in Table 3 were polymerized to make the unsaturated dicarboxylic acid anhydride polymer (A).

TABLE 3

| | Unsaturated dicarboxylic acid anhydride polymer (A) (Parts(s)) | |
|---|---|---|
| Components | A-3 | A-4 |
| Maleic anhydride | 15 | 15 |
| Styrene | 70 | 60 |
| Acrylonitrile | — | 15 |
| Polybutadiene rubber | 15 | 10 |
| Polymerization procedure* | B-S | B |

Note: *
B The polymerization was carried out by bulk polymerization.
B-S The polymerization was carried out by bulk-suspension polymerization.

REFERENCE EXAMPLE 4

Preparation of the modified olefin polymer (C):

(C-5) Ethylene and glycidyl methacrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-1), i.e. ethylene/glycidyl methacrylate (90:10 by weight) copolymer.

(C-6) Ethylene, glycidyl methacrylate and vinyl acetate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-6), i.e. ethylene/glycidyl methacrylate/vinyl acetate (85:10:5 by weight) copolymer.

(C-7) Powdery polyethylene (100 parts) and maleic anhydride (1 part) were mixed together and melt kneaded by the aid of two rolls for about 3 minutes to make a modified olefin polymer (C-7), i.e. maleic anhydride-modified polyethylene containing maleic anhydride in an amount of 1% by weight.

(C-8) Ethylene and ethyl acrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-8), i.e. ethylene/ethyl acrylate (90:10 by weight) copolymer.

EXAMPLES 10 TO 18 AND COMPARATIVE EXAMPLES 5 TO 7

The unsaturated dicarboxylic acid anhydride polymer (A-3 or A-4) as obtained in Reference Example 3, the polycarbonate resin (an aromatic polycarbonate resin comprising bisphenol A; molecular weight, 25,000) and the modified olefin polymer (C-5, C-6, C-7 or C-8) as obtained in Reference Example 4 were mixed well and melt kneaded by the aid of a single screw extruder (resin temperature, 260° C.) to make a thermoplastic resin composition.

The thermoplastic resin composition thus obtained was subjected to determination of the physical characteristics in the same manner as above.

The physical characteristics of the thermoplastic resin composition thus determined are shown in Table 4.

excellent in resistance to heat decomposition. The composition of the invention is also excellent in notched Izod impact strength and strength at weld part.

REFERENCE EXAMPLE 5

Preparation of the unsaturated dicarboxylic acid anhydride polymer (A):

According to a per se conventional bulk or bulk-suspension polymerization procedure, monomers as shown in Table 5 were polymerized to make the unsaturated dicarboxylic acid anhydride polymer (A).

TABLE 5

| Components | Unsaturated dicarboxylic acid anhydride polymer (A) (Parts(s)) | |
|---|---|---|
| | A-5 | A-6 |
| Maleic anhydride | 15 | 13 |
| Styrene | 85 | 62 |
| Acrylonitrile | — | 25 |
| Product (Intrinsic viscosity) | 0.63 | 0.65 |
| Polymerization procedure* | B | B-S |

Note: *
B The polymerization was carried out by bulk polymerization.
B-S The polymerization was carried out by bulk-suspension polymerization.

REFERENCE EXAMPLE 6

Preparation of the modified olefin polymer (C):

(C-9) Ethylene and glycidyl methacrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-9), i.e. ethylene/glycidyl methacry-

TABLE 4

| | Example | | | | | | | | | (part(s) by weight) Comparative | | |
|---|---|---|---|---|---|---|---|---|---|---|---|---|
| Composition | 10 | 11 | 12 | 13 | 14 | 15 | 16 | 17 | 18 | 5 | 6 | 7 |
| Unsaturated dicarboxylic acid anhydride polymer (A) | | | | | | | | | | | | |
| A-3 | 70 | 50 | 50 | 50 | — | — | 30 | 30 | 15 | 70 | 50 | 15 |
| A-4 | — | — | — | — | 50 | 30 | — | — | — | — | — | — |
| Polycarbonate resin (B) | 30 | 50 | 50 | 50 | 50 | 70 | 70 | 70 | 85 | 30 | 50 | 85 |
| Modified olefin polymer (C) | | | | | | | | | | | | |
| C-5 | 3 | 5 | — | — | — | — | — | — | 1 | — | — | — |
| C-6 | — | — | 10 | — | — | 0.5 | — | 20 | — | — | — | — |
| C-7 | — | — | — | 5 | — | — | 1 | — | — | — | — | — |
| C-8 | — | — | — | — | 10 | — | — | — | — | — | — | — |
| Resistance to heat decomposition | | | | | | | | | | | | |
| Falling ball impact strength (kg · cm) | 150 | 175 | 225 | 200 | 150 | 250 | 300 | 350 | 325 | <10 | <10 | 20 |
| Weight loss (%) | 2.1 | 1.2 | 0.4 | 1.0 | 1.1 | 1.7 | 1.0 | 0.5 | 0.9 | 10.4 | 7.7 | 2.5 |
| Silver | No | No | No | No | No | No | No | No | No | Yes | Yes | Yes |
| Weld strength (23° C.) (kg · cm) | 70 | 115 | 115 | 110 | 115 | 200 | 215 | 315 | 235 | <10 | <10 | <10 |
| Notched Izod impact strength (23° C.) (kg · cm/cm) | 25 | 43 | 48 | 43 | 48 | 55 | 50 | 43 | 27 | 8 | 35 | 25 |
| Heat deformation temperature (°C.) | 110 | 113 | 111 | 113 | 111 | 120 | 120 | 115 | 125 | 111 | 115 | 127 |
| Processability (230° C. 60 kg/cm²) (ml/min) | 0.81 | 0.33 | 0.30 | 0.33 | 0.35 | 0.24 | 0.23 | 0.16 | 0.10 | 0.85 | 0.37 | 0.11 |

From the above results, it is understood that in comparison with the polycarbonate resin incorporated with the unsaturated dicarboxylic acid anhydride polymer, the thermoplastic resin composition of the invention is late (90:10 by weight) copolymer.

(C-10) Ethylene, glycidyl methacrylate and vinyl acetate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-10), i.e. ethylene/glycidyl methacrylate/vinyl acetate (85:10:5 by weight) copolymer.

(C-11) Powdery polyethylene (100 parts) and maleic anhydride (1 part) were mixed together and melt kneaded by the aid of two rolls for about 3 minutes to make a modified olefin polymer (C-11), i.e. maleic anhydride-modified polyethylene containing maleic anhydride in an amount of 1% by weight.

(C-12) Ethylene and ethyl acrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-12), i.e. ethylene/ethyl acrylate (90:10 by weight) copolymer.

REFERENCE EXAMPLE 7

Preparation of the rubber-reinforced resin (D):
(D-1) Styrene and acrylonitrile were graft polymerized on styrene-butadiene rubber latex (styrene content, 10% by weight; solid content, 50% by weight; particle size, 0.41 micron) according to a conventional emulsion graft polymerization procedure to give a rubber-reinforced resin (D) having a rubber content of 50% by weight and an acrylonitrile content of 15% by weight.

(D-2) Styrene and methyl methacrylate were graft polymerized on polybutadiene rubber latex (solid content, 50% by weight; particle size, 0.35 micron) according to a conventional emulsion graft polymerization procedure to give a rubber-reinforced resin (D) having a rubber content of 50% by weight and a methyl methacrylate content of 30% by weight.

EXAMPLES 19 TO 28 AND COMPARATIVE EXAMPLES 8 TO 11

The unsaturated dicarboxylic acid anhydride polymer (A-5 or A-6) as obtained in Reference Example 5, the polycarbonate resin (an aromatic polycarbonate resin comprising bisphenol A; molecular weight, 25,000) and the modified olefin polymer (C-9, C-10, C-11 or C-12) as obtained in Reference Example 6 and the rubber-reinforced resin (D-1 or D-2) as obtained in Reference Example 7 were mixed well and melt kneaded by the aid of a single screw extruder (resin temperature, 260° C.) to make a thermoplastic resin composition.

The thermoplastic resin composition thus obtained was subjected to determination of the physical characteristics in the same manner as above.

The physical characteristics of the thermoplastic resin composition thus determined are shown in Table 6.

TABLE 6

| Composition | Example | | | | | | | | | | Comparative (part(s) by weight) | | | |
|---|---|---|---|---|---|---|---|---|---|---|---|---|---|---|
| | 19 | 20 | 21 | 22 | 23 | 24 | 25 | 26 | 27 | 28 | 8 | 9 | 10 | 11 |
| Unsaturated dicarboxylic acid anhydride polymer (A) | | | | | | | | | | | | | | |
| A-5 | 30 | 30 | 30 | 40 | — | 20 | — | 20 | 15 | 10 | 50 | 30 | 30 | 20 |
| A-6 | — | — | — | — | 40 | — | 20 | — | — | 15 | — | — | — | — |
| Polycarbonate resin (B) | 50 | 50 | 50 | 50 | 50 | 70 | 70 | 70 | 70 | 70 | 50 | 50 | 70 | 70 |
| Modified olefin polymer (C) | | | | | | | | | | | | | | |
| C-9 | 1 | — | — | 15 | — | — | — | — | 5 | — | — | — | — | — |
| C-10 | — | 5 | — | — | 10 | — | 20 | — | — | 5 | — | — | — | — |
| C-11 | — | — | 5 | — | — | 10 | — | — | — | — | — | — | — | — |
| C-12 | — | — | — | — | — | — | — | 5 | — | — | — | — | — | — |
| Rubber-reinforced resin (D) | | | | | | | | | | | | | | |
| D-1 | 20 | 20 | 20 | 10 | — | — | 10 | — | 15 | — | — | 20 | — | 10 |
| D-2 | — | — | — | — | 10 | 10 | — | 10 | — | 5 | — | — | — | — |
| Resistance to heat decomposition | | | | | | | | | | | | | | |
| Falling ball impact strength (kg · cm) | 150 | 200 | 225 | 250 | 175 | 300 | 275 | 275 | 325 | 250 | <10 | 20 | <10 | 15 |
| Weight loss (%) | 1.2 | 0.9 | 0.7 | 0.6 | 1.0 | 1.1 | 0.7 | 1.0 | 0.4 | 0.8 | 8.9 | 7.5 | 6.4 | 6.1 |
| Silver | No | No | No | No | No | No | No | No | No | No | Yes | Yes | Yes | Yes |
| Weld strength (23° C.) (kg · cm) | 100 | 140 | 130 | 180 | 155 | 120 | 118 | 120 | 120 | 120 | <10 | <10 | <10 | <10 |
| Notched Izod impact strength (23° C.) (kg · cm/cm) | 36.8 | 35.2 | 33.1 | 28.3 | 28.5 | 48.3 | 43.5 | 45.1 | 55.2 | 50.7 | 2.4 | 37.0 | 7.8 | 5.3 |
| Heat deformation temperature (°C.) | 116 | 113 | 113 | 112 | 114 | 120 | 118 | 120 | 120 | 122 | 115 | 116 | 125 | 121 |
| Processability (230° C. 60 kg/cm²) (ml/min) | 0.38 | 0.38 | 9.38 | 0.31 | 0.33 | 0.19 | 0.18 | 0.20 | 0.25 | 0.28 | 0.97 | 0.40 | 0.38 | 0.25 |

From the above results, it is understood that in comparison with the polycarbonate resin incorporated with the unsaturated dicarboxylic acid anhydride polymer and the polycarbonate resin incorporated with the unsaturated dicarboxylic acid anhydride polymer and the rubber-reinforced resin, the thermoplastic resin composition of the invention is excellent in resistance to heat decomposition. The composition of the invention is also excellent in notched Izod impact strength and strength at weld part. Further, it is well balanced in the relationship of processability, impact strength and heat resistance.

REFERENCE EXAMPLE 8

Preparation of the unsaturated dicarboxylic acid anhydride polymer (A):

According to a per se conventional bulk or bulk-suspension polymerization procedure, monomers as shown in Table 7 were polymerized to make the unsaturated dicarboxylic acid anhydride polymer (A).

TABLE 7

| Components | Unsaturated dicarboxylic acid anhydride polymer (A) (Parts(s)) | |
|---|---|---|
| | A-7 | A-8 |
| Maleic anhydride | 15 | 15 |
| Styrene | 70 | 60 |
| Acrylonitrile | — | 15 |
| Polybutadiene rubber | 15 | 10 |
| Polymerization procedure* | B-S | B |

Note: *
B The polymerization was carried out by bulk polymerization.
B-S The polymerization was carried out by bulk-suspension polymerization.

REFERENCE EXAMPLE 9

Preparation of the modified olefin polymer (C):

(C-13) Ethylene and glycidyl methacrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-13), i.e. ethylene/glycidyl methacrylate (90:10 by weight) copolymer.

(C-14) Ethylene, glycidyl methacrylate and vinyl acetate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-14), i.e. ethylene/glycidyl methacrylate/vinyl acetate (85:10:5 by weight) copolymer.

(C-15) Powdery polyethylene (100 parts) and maleic anhydride (1 part) were mixed together and melt kneaded by the aid of two rolls for about 3 minutes to make a modified olefin polymer (C-15), i.e. maleic anhydride-modified polyethylene containing maleic anhydride in an amount of 1% by weight.

(C-16) Ethylene and ethyl acrylate as well as a catalyst were charged into an autoclave type apparatus for production of polyethylene, and bulk polymerization was carried out at a temperature of 150° to 300° C. under a pressure of 2,000 kg/cm² to make a modified olefin polymer (C-16), i.e. ethylene/ethyl acrylate (90:10 by weight) copolymer.

REFERENCE EXAMPLE 10

Preparation of the rubber-reinforced resin (D):

(D-3) Styrene and acrylonitrile were graft polymerized on styrene-butadiene rubber latex (styrene content, 10% by weight, solid content, 50% by weight; particle size, 0.41 micron) according to a conventional emulsion graft polymerization procedure to give a rubber-reinforced resin (D) having a rubber content of 50% by weight and an acrylonitrile content of 15% by weight.

(D-4) Styrene and methyl methacrylate were graft polymerized on polybutadiene rubber latex (solid content, 50% by weight; particle size, 0.35 micron) according to a conventional emulsion graft polymerization procedure to give a rubber-reinforced resin (D) having a rubber content of 50% by weight and a methyl methacrylate content of 30% by weight.

EXAMPLES 29 TO 36 AND COMPARATIVE EXAMPLE 12

The unsaturated dicarboxylic acid anhydride polymer (A-7 or A-8) as obtained in Reference Example 8, the polycarbonate resin (an aromatic polycarbonate resin comprising bisphenol A; molecular weight, 25,000), the modified olefin polymer (C-13, C-14, C-15 or C-16) as obtained in Reference Example 9 and the rubber-reinforced resin (D-3 or D-4) were mixed well and melt kneaded by the aid of a single screw extruder (resin temperature, 260° C.) to make a thermoplastic resin composition.

The thermoplastic resin composition thus obtained was subjected to determination of the physical characteristics in the same manner as above.

The physical characteristics of the thermoplastic resin composition thus determined are shown in Table 8.

TABLE 8

| Composition | Example | | | | | | | | (part(s) by weight) Comparative |
|---|---|---|---|---|---|---|---|---|---|
| | 29 | 30 | 31 | 32 | 33 | 34 | 35 | 36 | 12 |
| Unsaturated dicarboxylic acid anhydride polymer (A) | | | | | | | | | |
| A-7 | 40 | — | 40 | — | 10 | — | 20 | 70 | 50 |
| A-8 | — | 40 | — | 40 | — | 10 | — | — | — |
| Polycarbonate resin (B) | 50 | 50 | 50 | 50 | 70 | 70 | 70 | 20 | 50 |
| Modified olefin polymer (C) | | | | | | | | | |
| C-13 | 5 | — | — | — | 5 | — | — | — | — |
| C-14 | — | 10 | — | — | — | — | 1 | — | — |
| C-15 | — | — | 15 | — | — | — | — | 15 | — |
| C-16 | — | — | — | 5 | — | 5 | — | — | — |
| Rubber-reinforced resin (D) | | | | | | | | | |
| D-3 | 10 | — | 10 | 5 | 20 | — | — | 10 | — |
| D-4 | — | 10 | — | 5 | — | 20 | 10 | — | — |
| Resistance to heat decomposition | | | | | | | | | |
| Falling ball impact strength (kg · cm) | 225 | 275 | 300 | 175 | 350 | 325 | 310 | 90 | <10 |
| Weight loss (%) | 1.0 | 1.3 | 0.7 | 0.9 | 0.6 | 0.4 | 0.8 | 1.7 | 8.4 |

TABLE 8-continued

| Composition | Example 29 | 30 | 31 | 32 | 33 | 34 | 35 | 36 | Comparative 12 (part(s) by weight) |
|---|---|---|---|---|---|---|---|---|---|
| Silver | No | No | No | No | No | No | No | No | Yes |
| Weld strength (23° C.) (kg · cm) | 130 | 140 | 160 | 120 | 255 | 250 | 220 | 90 | <10 |
| Notched Izod impact strength (23° C.) (kg · cm/cm) | 55 | 51 | 48 | 41 | 53 | 58 | 51 | 16 | 35 |
| Heat deformation temperature (°C.) | 112 | 110 | 108 | 113 | 118 | 117 | 118 | 106 | 115 |
| Processability (230° C. 60 kg/cm$^2$) (ml/min) | 0.22 | 0.20 | 0.21 | 0.27 | 0.30 | 0.25 | 0.36 | 0.95 | 0.37 |

From the above results, it is understood that in comparison with the polycarbonate resin incorporated with the unsaturated dicarboxylic acid anhydride polymer, the thermoplastic resin composition of the invention is excellent in resistance to heat decomposition. The composition of the invention is also excellent in notched Izod impact strength and strength at weld part. Further, it is excellent in heat resistance.

What is claimed is:

1. A thermoplastic resin composition which comprises:
    (A) an unsaturated dicarboxylic acid anhydride polymer produced by polymerization of (a-1) at least one unsaturated dicarboxylic acid anhydride and (a-2) at least one of aromatic vinyl compounds, unsaturated nitrile compounds and unsaturated carboxylic acid esters,
    (B) a polycarbonate resin, and
    (C) at least one modified olefin polymer selected from the group consisting of (C-I) an olefin/alkyl unsaturated carboxylate copolymer, (C-II) an unsaturated carboxylic acid-modified olefin polymer and (C-III) an epoxy group-containing olefin polymer.

2. The thermoplastic resin composition according to claim 1, wherein the weight proportion of the unsaturated dicarboxylic acid anhydride polymer (A) and the polycarbonate resin (B) is from 10:90 to 90:10.

3. The thermoplastic resin composition according to claim 1, wherein the modified olefin polymer (C) is (C-I) the olefin/alkyl unsaturated carboxylate copolymer alone or a mixture of (C-I) the olefin/alkyl unsaturated carboxylate copolymer with (C-II) the unsaturated carboxylic acid-modified olefin polymer or (C-III) the epoxy group-containing olefin polymer, or a mixture of (C-I) the olefin/alkyl unsaturated carboxylate copolymer with (C-II) the unsaturated carboxylic acid-modified olefin polymer and (C-III) the epoxy group-containing olefin polymer.

4. The thermoplastic resin composition according to claim 1 wherein component (A) is produced by polymerization of (a-1) and (a-2) in the presence of (a-3) at least one rubbery material.

5. The thermoplastic resin composition according to claim 4 comprising additionally
    (D) a rubber-reinforced resin produced by polymerizing (d-1) at least one of aromatic vinyl compounds, unsaturated nitrile compounds and unsaturated carboxylic acid esters in the presence of (d-2) a rubber polymer.

6. The thermoplastic resin composition according to claim 5, wherein the weight proportion of the unsaturated dicarboxylic acid anhydride polymer (A), the polycarbonate resin (B) and the rubber-reinforced resin (D) is 5–50:30–90:5–50.

7. The thermoplastic resin composition according to claim 1 wherein component (A) is produced by polymerizing (a-1) and (a-2) in the absence of rubbery material.

8. The thermoplastic resin composition according to claim 7 comprising additionally
    (D) a rubber-reinforced resin produced by polymerizing (d-1) at least one of aromatic vinyl compounds, unsaturated nitrile compounds and unsaturated carboxylic acid esters in the presence of (d-2) a rubbery polymer.

9. The thermoplastic resin composition according to claim 8, wherein the weight proportion of the unsaturated dicarboxylic acid anhydride polymer (A), the polycarbonate resin (B) and the rubber-reinforced resin (D) is 10–60:30–80:10–50.

10. The thermoplastic resin composition according to claim 1 comprising additionally
    (D) a rubber-reinforced resin produced by polymerizing (d-1) at least one of aromatic vinyl compounds, unsaturated nitrile compounds and unsaturated carboxylic acid esters in the presence of (d-2) a rubber polymer.

11. The thermoplastic resin composition according to claim 10, wherein the weight proportion of the unsaturated dicarboxylic acid anhydride polymer (A), the polycarbonate resin (B) and the rubber-reinforced resin (D) is 5–60:30–90:5–50.

12. The thermoplastic resin composition according to claim 10, wherein the amount of the modified olefin polymer (C) is from 0.1 to 100 parts by weight to 100 parts by weight of the combined amount of the unsaturated dicarboxylic acid anhydride polymer (A), the polycarbonate resin (B) and the rubber-reinforced resin (D).

13. The thermoplastic resin composition according to claim 1 which does not contain (D) a rubber-reinforced resin produced by polymerizing (d-1) at least one of aromatic vinyl compounds, unsaturated nitrile compounds and unsaturated carboxylic acid esters in the presence of (d-2) a rubber polymer.

14. The thermoplastic resin composition according to claim 13, wherein the amount of the modified olefin polymer (C) is from 0.1 to 100 parts by weight to 100 parts by weight of the combined amount of the unsaturated dicarboxylic acid anhydride polymer (A) and the polycarbonate resin (B).

* * * * *